(12) United States Patent
Meadowcroft

(10) Patent No.: US 6,739,763 B2
(45) Date of Patent: May 25, 2004

(54) METHOD FOR ALIGNMENT OF OPTICAL COMPONENTS

(75) Inventor: Simon Meadowcroft, Stowmarket (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/236,306

(22) Filed: Sep. 6, 2002

(65) Prior Publication Data

US 2003/0077051 A1 Apr. 24, 2003

(30) Foreign Application Priority Data

Oct. 22, 2001 (EP) .......................... 01308966

(51) Int. Cl.[7] .............................. G02B 6/42
(52) U.S. Cl. ............................ 385/91; 385/90
(58) Field of Search .................. 385/51–53, 88–91

(56) References Cited

U.S. PATENT DOCUMENTS

| | | | | |
|---|---|---|---|---|
| 4,778,241 A | | 10/1988 | Haltenorth | 350/96.2 |
| 5,231,686 A | * | 7/1993 | Rabinovich | 385/93 |
| 5,247,597 A | * | 9/1993 | Blacha et al. | 385/88 |
| 5,745,624 A | | 4/1998 | Chan et al. | 385/91 |
| 6,164,837 A | | 12/2000 | Haake et al. | 385/90 |
| 6,435,735 B1 | * | 8/2002 | Ramsey | 385/90 |
| 6,546,172 B2 | * | 4/2003 | Case et al. | 385/52 |
| 6,546,173 B2 | * | 4/2003 | Case et al. | 385/52 |

FOREIGN PATENT DOCUMENTS

| | | |
|---|---|---|
| EP | 0 579 439 A1 | 1/1994 |
| JP | 04242705 | 8/1992 |

OTHER PUBLICATIONS

Luck, W., Examiner. European Search Report, Application No. EP 01 30 8966, dated Apr. 22, 2002.

Musa Jouaneh et al. "Real Time Control of Thermal Distortion During Pulsed Laser Welding of Optical Packages," Journal of Engineering for Industry, vol. 118, No. 3, Aug. 1, 1996, pp. 445–448, XP000622451.

* cited by examiner

Primary Examiner—John D. Lee

(57) ABSTRACT

A method for aligning optical components in an optical assembly. The method comprises the steps of pre-aligning the optical fiber to the optical device, measuring a coupling efficiency of the optical fiber to the optical device, applying energy to a support means, the energy being sufficient to enable the support means to become ductile, and applying a force to the support means in a direction which increases the coupling efficiency.

8 Claims, 2 Drawing Sheets

METHOD FOR ALIGNMENT OF OPTICAL COMPONENTS

FIELD OF THE INVENTION

The present invention relates to a method for aligning optical components. More specifically, the present invention relates to a method for aligning an optical fibre to an optical device.

DISCUSSION OF THE BACKGROUND

Current methods of aligning optical fibres to optical devices, such as laser diodes and photo diodes, are expensive and time consuming. In addition, these known methods do not provide the accuracy required for modem optical fibre applications such as is required in optical telecommunications systems.

The present invention overcomes these technical problems by providing a simpler and more accurate method for aligning and fixing optical components in an optical assembly.

SUMMARY OF THE INVENTION

According to the present invention there is provided a method of aligning an optical fibre to an optical device comprises the steps of pre-aligning the optical fibre to the optical device, measuring a coupling efficiency of the optical fiber to the optical device, applying energy to a support means, said energy being sufficient to enable the support means to become ductile, and applying a force to the support means in a direction which increases the coupling efficiency.

The step of pre-aligning the optical fibre to the optical device may include the steps of raising the optical fiber, inserting the support means, and welding the support means in place.

Advantageously, the present invention provides a more accurate method of aligning an optical fibre to an optical device. Furthermore, the present invention provides for a continuous joint in which there are no fixing or weld gaps.

BRIEF DESCRIPTION OF THE DRAWINGS

While the principle advantages and features of the invention have been described above, a greater understanding and appreciation of the invention may be obtained by referring to the drawings and detailed description of the preferred embodiment, presented by way of example only, in which.

DETAILED DESCRIPTION OF THE PREFERRED EMBODIMENT

Figure 1:
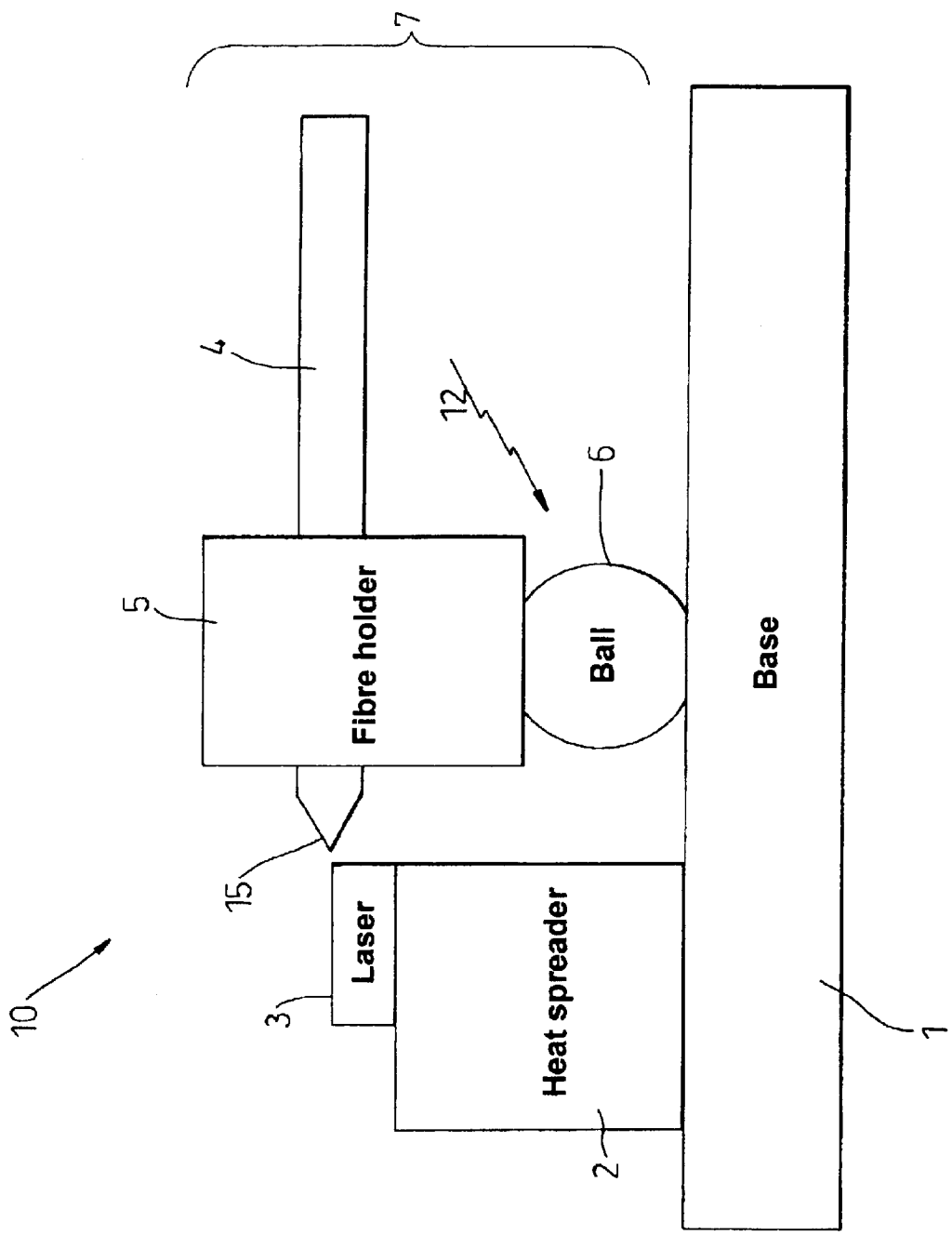
FIG. 1 is a side view of an optical assembly aligned according to present invention, and, FIG. 2 is a flow diagram of a method for aligning the optical assembly of FIG. 1.

In FIG. 1 optical assembly 10 is shown comprising optical fibre 4 mounted in fiber holder 5. One end of the optical fibre is aligned to optical device 3. Support member 6 is disposed between the fiber holder and baseplate 1. In this embodiment the support member 6 is a ball bearing. However, as will be appreciated other types of support member, such as rods, can be used. Preferably, the ball bearing is fixed to the fiber holder and baseplate by resistive welding. However, as will be appreciated, other fixing methods can be used, such as laser welding.

Accurate alignment of the fibre to the optical device is achieved as follows. Rough alignment of end 15 of the fibre to the optical device 3 is done using conventional micro alignment equipment. The fibre holder 5 is then raised to allow the ball bearing 6 to be inserted between the fibre holder 5 and the baseplate 1 and welded in place. During welding the ball bearing collapses returning the fibre holder to its pre-aligned position before it was raised. Next accurate alignment of the fibre to the optical device is achieved by applying energy to the ball bearing. Preferably this energy is applied in a series of pulses. More preferably these pulses are current pulses. Alternatively, continuous energy is applied to the ball bearing.

During the application of energy, the ball bearing increases in temperature and becomes more ductile. Force is then applied to the ball bearing in a direction which results in an increase in the coupling efficiency of the fiber to the optical device. As will be appreciated, as a force is applied to the ball bearing, the entire fiber assemble 7 may move in response to this force. When maximum coupling efficiency has been reached, the fiber and device are said to be aligned. As is well known in the art, maximum coupling efficiency can be determined by powering the optical device and monitoring the power of the light output from the fibre.

As will be appreciated, other criteria may be used to determine when the fiber and device are aligned, such as minimum coupling loss between a fibre and a waveguide or between two waveguides.

Once the fiber and device are deemed to be aligned the energy and force are discontinued and the ball bearing is allowed to return to ambient temperature. During the return to ambient temperature, the position of the ball bearing and hence the alignment of the fibre to the laser will not change. Preferably, the return to ambient temperature is achieved as the energy being applied to the ball bearing is decreased. This can be done by ramping down the current driving the source of the energy.

The force applied to the ball bearing during the application of energy is preferably a physical force and is achieved with known micro-positioning equipment.

Figure 2:
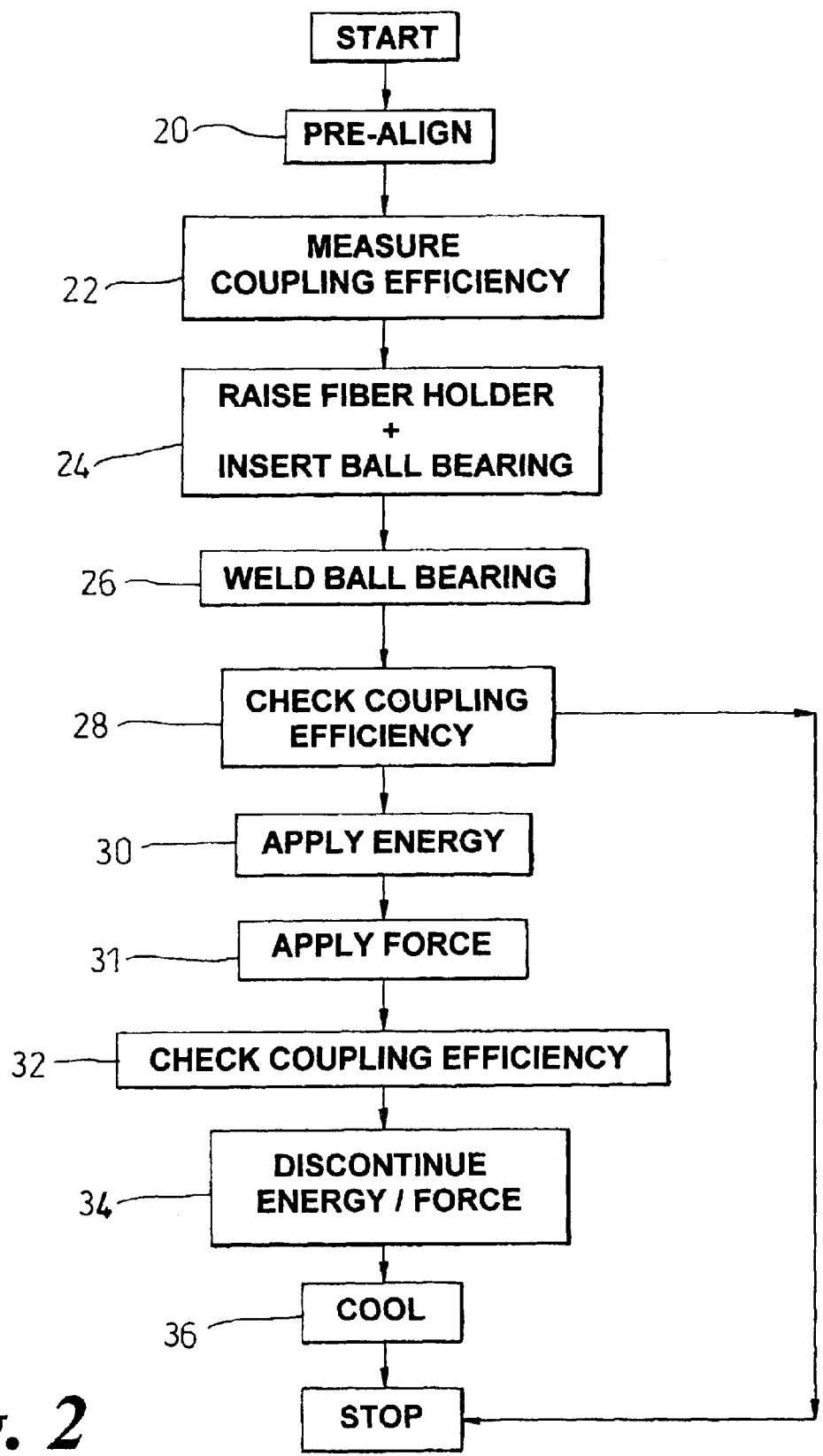

As shown in FIG. 2, the steps involved in aligning an optical fiber to an optical device can be summarised as follows. The fibre is pre-align to the optical device (Step 20). The coupling efficiency of the pre-aligned fiber and device is measured (Step 22). The fiber holder is raised and the ball bearing is inserted between the fibre holder and the baseplate (Step 24). The ball bearing is then welded in place (Step 26). During Step 26 the ball bearing collapses returning the fiber holder to its pre-aligned position. The coupling efficiency is then checked again (Step 28) before proceeding with fine tuning the alignment. As will be appreciated, if the coupling efficiency at this stage is sufficient, then the alignment procedure can be stopped without the need for Steps 30 through 36. However if fine tuning is required, energy is applied to the ball bearing (Step 30). As the temperature in the ball bearing increases it becomes ductile. A force is then applied to the ball bearing or alternatively to the entire fiber assembly (Step 31). During the application of force the coupling efficiency is monitored (Step 32). Once maximum coupling efficiency is reached the application of force and energy are discontinued (Step 34). Finally, the assembly is allowed to cool (Step 36).

As will be appreciated, Steps 30, 31 and 32 may occurs in a variety of time sequences. For example, the application of energy (Step 30) may be for the entire period in which a force (Step 31) in being applied. Alternatively, Step 30 may be only for a period of time sufficient to raise the temperature of the ball bearing to a point where it becomes ductile.

Alternatively, Step 30 may be repeated periodical as needed to enable the ball bearing to remain ductile. Similarly, the application of force (Step 31) may be intermittent or continuous. Finally, the monitoring of the coupling efficiency (Step 32) may be intermittent or continuous.

It is not intended that the present invention be limited to the above embodiments and other modifications and variations are envisaged within the scope of the claims.

What is claimed is:

1. A method of aligning an optical fibre to an optical device comprising:

pre-aligning said optical fibre to said optical device, measuring a coupling efficiency of said optical fibre to said optical device, apply current to a support means to cause said support means to become ductile, and applying a force to said support means in a direction that increases the coupling efficiency.

2. A method as claimed in claim 1, wherein the step of pre-aligning the optical fibre to said optical device includes the steps of:

raising said optical fibre inserting said support means, and welding said support means in place.

3. A method as claimed in claim 1, wherein the current is pulses of current.

4. A method as claimed in claim 1, wherein said support means is a ball bearing.

5. An optical component aligned by the process which comprises:

pre-aligning an optical fibre to said optical component, measuring a coupling efficiency of said optical fibre to said optical component, applying current to a support means to cause said support means to become ductile, and applying a force to said support means in a direction that increases the coupling efficiency.

6. The optical component as claimed in claim 5, wherein the step of pre-aligning the optical fibre to said optical component includes the steps of:

raising said optical fibre, inserting said support means, and welding said support means in place.

7. The optical component as claimed in claim 5, wherein the current is pulses of current.

8. The optical component as claimed in claim 5, wherein said support means is a ball bearing.

* * * * *